June 21, 1927.
S. J. WILLIAMS
1,633,301
METHOD AND APPARATUS FOR TREATING SEED GRAIN
Filed Feb. 13, 1923    2 Sheets-Sheet 1
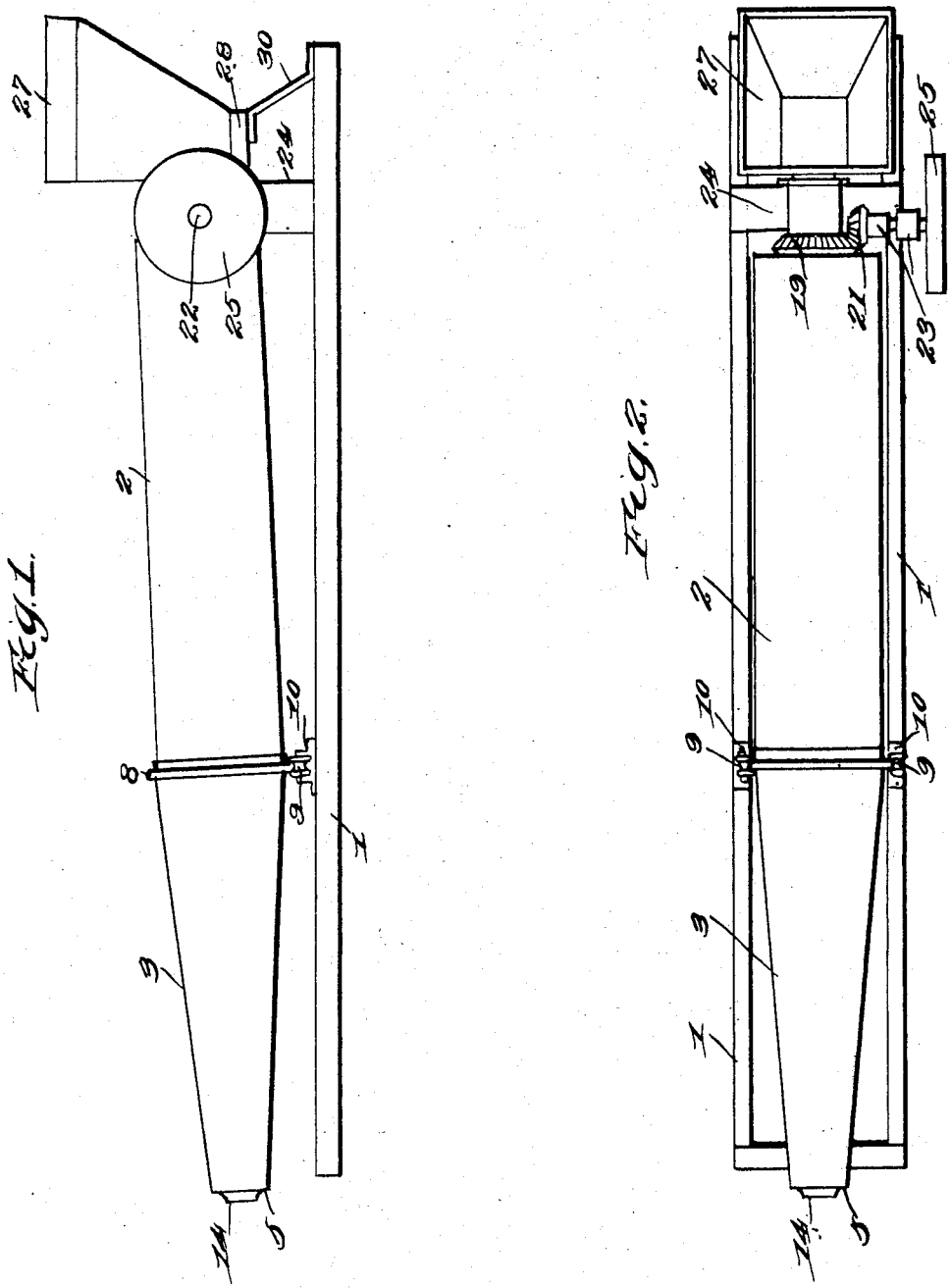
Inventor
Sylvester J. Williams
by Carl A. Crawford
Attorney June 21, 1927. 1,633,301
S. J. WILLIAMS
METHOD AND APPARATUS FOR TREATING SEED GRAIN
Filed Feb. 13, 1923 2 Sheets-Sheet 2
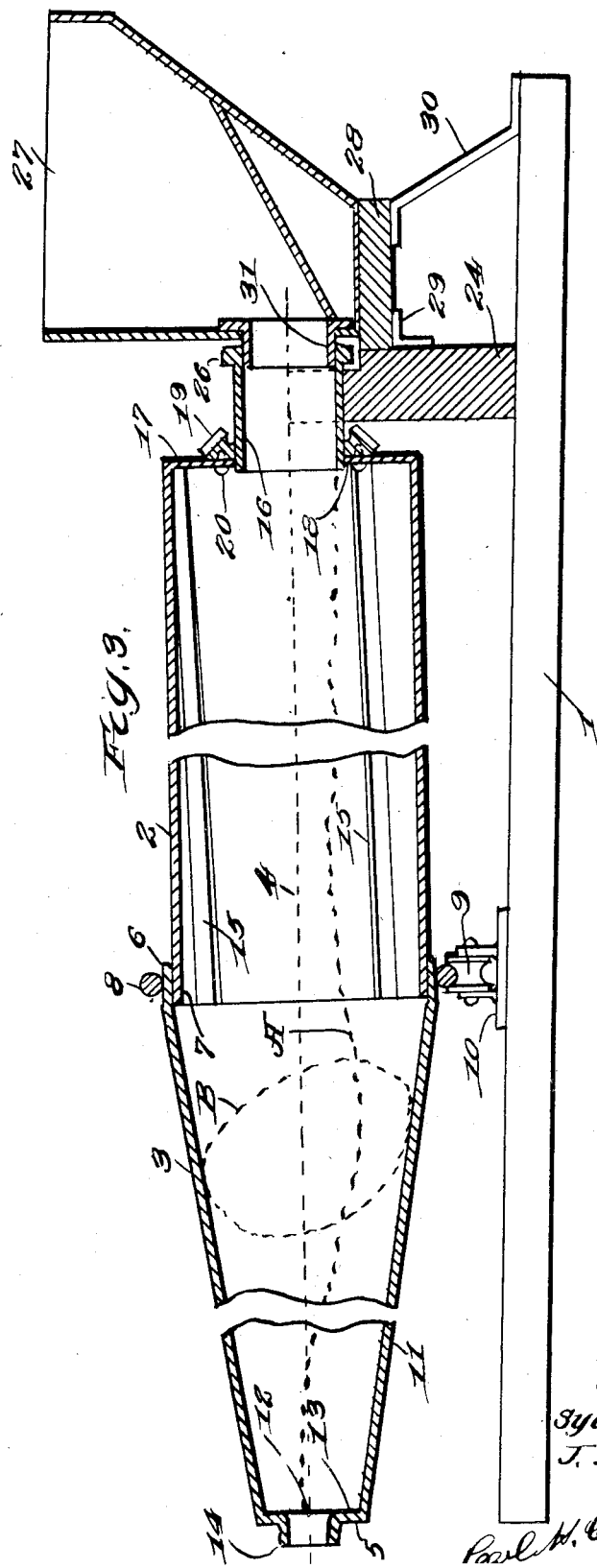
Inventor
Sylvester J. Williams
Paul H. Crawford
Attorney Patented June 21, 1927.

1,633,301

UNITED STATES PATENT OFFICE.

SYLVESTER J. WILLIAMS, OF RITZVILLE, WASHINGTON, ASSIGNOR TO CORNELIUS ALLERT, OF RITZVILLE, WASHINGTON.

METHOD AND APPARATUS FOR TREATING SEED GRAIN.

Application filed February 13, 1923. Serial No. 618,806.

This invention relates to an improved method and apparatus for imparting dry treatment to seed grain to prevent the formation or growth of smut or any other fungus. Recently, it has been found that copper of carbonate, in dry powder form, will effectively prevent smut from forming on seed wheat, this powder being now the most effective fungicide known. However, this powder is relatively expensive and while various devices have been used to coat the kernels, such coating will not only rub off but can easily be blown off. Further, it has been found impossible, heretofore, to prevent considerable loss of the powder in the course of treatment, this powder being of dust like fineness. In all devices known to me, the treatment of the seed grain is necessarily intermittent, partly by reason of lack of control of the loss of this powder, and partly for other reasons.

Now it is a primary object of this invention to provide a novel method and apparatus whereby the treatment can be carried on continuously.

It is a further object to mix and initially coat the kernels with this powder, or any other fungicide powder, and subsequently "fix" such coating so that it will not be worn, rubbed or blown off.

In one form of my method and apparatus, the powder and seed grain are agitated or mixed in such a manner that a preliminary coating or dusting of the kernels is effectively applied, and then the coated or dusted kernels are rolled or given a frictional or attritional treatment which not only serves to completely saturate the brush of the kernel, but also fill the crevice thereof.

In the frictional or attritional treatment, it is a feature of my invention to offer such resistance to discharge of the grain that the same will not discharge in the absence of a thrust upon the same. Thus, it is a feature to rely upon the feed of grain to cause discharge movement by accumulated bulk of the fed grain.

My improved method and apparatus has many other features of novelty which will be more fully described in connection with the accompanying drawings and which will be more particularly pointed out in and by the appended claims.

In the drawings:—

Fig. 1, is a view in side elevation of my improved apparatus.

Fig. 2, is a plan view thereof.

Fig. 3, is a longitudinal sectional view thereof.

Like characters of reference designate similar parts throughout the different figures of the drawings.

As shown, the device is mounted on a frame base 1 which is intended to be horizontally disposed. A hollow or tubular body is rotatively mounted on said base and consists, as shown, of a cylindrical section 2, and a tapered or truncated conical section 3. These sections are connected so that their longitudinal axes are coincident, and I will designate the longitudinal axis of the entire body at 4. The body is preferably mounted to incline the rotative axis thereof downwardly toward the discharge end 5. In practice, I telescope the rear end 6, of section 3, over the front end 7, of section 2, and rivet or otherwise secure the same. Thus it will be seen that this form of joint will not hinder passage of the grain from section 2 to section 3. Peripherally of end 6, I dispose an annular track or rail 8, which I preferably shrink into place, thereby more securely holding the sections united. Grooved wheels 9, journalled in brackets 10, fastened to the base 1, receive the circular rail 8, and rotatively support the forward end of the tubular body. The rear, or intake end of said body is supported in a journal which will be later described.

Now it will be clear that while the tubular body is inclined downwardly toward its discharge end, as regards its rotative axis 4, still, the taper of section 3 is such that its lowermost portion 11, will be inclined upwardly toward the discharge end 5. It will also be seen that I have provided an opening 12, in the end 5, which opening is smaller in diameter than the minimum diameter of section 3, thereby forming a resisting wall 13, which normally resists discharge of the grain until the depth of the latter reaches the opening 12. I may flange the opening 12, as shown at 14.

Now the result of this construction is that discharge movement of the grain from section 3, is always restrained. The grain must travel upwardly at an incline to discharge through opening 12, not only because of the upward incline of the lower-most portion 11, but also because of wall 13. Hence, the normal tendency of both the grain and the powder is to travel to the right of Fig. 3, instead of toward the discharge end 5. By means of this construction, practically no powder discharges through opening 12, even when the grain is discharging therethrough. Further, in most instances, that is when the device is being operated properly and at its maximum efficiency, the stream of grain discharging through opening 12, partly substantially closes said opening so that the powder cannot escape, and the opening 12 is purposely restricted in size with a view of insuring such operation.

The internal periphery of section 3, is entirely smooth, and hence as this section is rotated, the grain is rolled against the powder with considerable pressure by reason of the weight of the grain, and the powder is therefore rubbed against and upon the periphery of the kernel in such a manner as to "fix" the coating thereon. Further, the brush of the kernel is not only saturated with powder but the crevice of the kernel is packed full of the powder. In practice, I have found that there is some property in the powder or kernel whereby the particular powder herein mentioned, will adhere very securely when completely rubbed. It may be that the grain has moisture enough to perform this function, but at any rate, experience shows that by frictionally rubbing the kernels and powder together, as by the rolling action of section 3, the coating is most effectively applied to the kernels and cannot be blown off or rubbed off.

Thus, I consider this rolling or attritional treatment which is obtained in section 3, as complete in itself, irrespective of the cylinder 2, and irrespective of the taper of section 3, providing some means is provided to cause an action similar to section 3, namely, a restraining action simultaneously with a sustained rubbing action of the grain and powder.

As a means for advancing the grain through section 3, and also as a means for mixing the grain and powder and thereby imparting a preliminary or partial dusting or coating of the grain, the latter and the powder are first delivered to section 2, and the latter is preferably provided with lifting and discharging blades 15, preferably three in number. As the body revolves, the blades 15, successively lift and then discharge the grain and powder thereby thoroughly tumbling and mixing the grain and powder and incidently dusting the former. In order that the blades may assist in advancing the grain, in addition to the incline of section 2, I preferably cant the blades 15, in the direction of rotation of section 2, rather than dispose the blades in parallel relation with the axis 4.

Dotted line A, in Fig. 3, shows, approximately, the level of the grain and powder in section 3, when the device is most efficiently operated. The inclination serves to advance the grain in section 3, by means of the surplus that is fed from section 2, and the resulting flow through opening 12, is sufficient to substantially close said opening to egress of powder. In other words, while the upward incline 11, of section 3, always tends to move the grain away from opening 12, instead of toward it, still, this action is overcome by the preponderance of feed from section 2, and hence the grain is forced to discharge through opening 12. I have placed a marble in section 3, and operated with low capacity, and high speed, and in observing the marble, it described a path similar to the elliptical line B, in Fig. 3. To get the best results in practical operation, the body is driven at about thirty revolutions per minute.

I will next describe the manner of delivery of the grain and powder to section 2, while the same is revolving.

A pipe 16, is suitably fixed to the end 17, of section 2, and the end 17 is provided with an opening 18, into which the pipe 16 projects. A ring gear wheel 19, is fixed, as by means such as screws 20, in concentric relation about pipe 16. A bevel pinion 21, meshing with gear 19, is mounted on shaft 22, which is journalled in bearing 23, mounted on block 24. A pulley wheel 25, is mounted on shaft 22, and may be belted to any suitable source of power. The top of block 24, is U-shaped to receive the pipe 16, and serve as an open bearing therefor. A flange 26, on pipe 16, serves to retain the latter in position in the block. A hopper 27, is mounted on a bracket 28, supported at 29, on block 24, and by a leg 30. The hopper 27, has a delivery pipe 31, which telescopes interiorly of pipe 16. Thus, the sections 2 and 3, forming the tubular body, are rotatively mounted on the wheels 9, and by the block 24.

Now one of the most important advantages of this construction is that the device may be continuously fed while it is in actual operation, the feed being through the rear journal bearing of the substantially closed tubular body. Thus, the powder cannot escape from either end of the device. In case of repair, or to completely empty the tubular body, the same can be lifted free from both its bearings, or tilted up on end. I prefer to make the short pipe 31, retractable to permit disconnection. Or, if the body is lifted from the smaller end, disconnection from pipe 31, can be readily effected.

While I have herein disclosed specific forms of my improved method and apparatus, I do not wish to be limited thereto except for such limitations as the claims may import.

I claim:—

1. A friction dry seed treater comprising in combination, a tubular body for containing the seed grain and a fungicide powder rotatably mounted with its axis at a downward inclination to the horizontal and having an intake end higher than its discharge end, that portion of said body nearest said discharge end being tapered sufficiently to incline its lowermost portion upwardly from the horizontal.

2. A friction dry seed treater comprising in combination, a tubular body for containing the seed grain and a fungicide powder rotatably mounted with its axis at a downward inclination to the horizontal, said body having a cylindrical intake section and a conical discharge section of sufficient taper to dispose the lowermost portion of said discharge section at an upward inclination to the horizontal.

3. A friction dry seed treater comprising in combination, a tubular body adapted to contain the seed grain and a fungicide powder and having a cylindrical intake section and a conical discharge section, means rotatably mounting said body to dispose its axis at an inclination to the horizontal with said intake section higher than said discharge section, and said discharge section having an axially disposed discharge opening of reduced diameter with respect to the minimum diameter of said conical section to form a wall restricting discharge from said conical section.

4. A friction dry seed treater comprising in combination, a tubular body adapted to receive the seed grain and a fungicide powder and having a cylindrical intake section and a conical discharge section, means rotatably mounting said body to dispose its axis at an inclination to the horizontal with said intake section higher than said discharge section, and said discharge section having an axially disposed outlet opening smaller in diameter than the minimum diameter of said conical discharge section to form an end wall resisting discharge through said opening, and said discharge section being sufficiently tapered to dispose the lowermost portion of said discharge section at an upward inclination to the horizontal thereby resisting discharge of powder.

5. A friction dry seed treater comprising in combination, a tubular body rotatable at a downward inclination toward its discharge end and adapted to contain the seed and a fungicide powder, said body having a section resisting advance movement of the grain therethrough and a section promoting advance passage of the grain and the latter section being controlling to advance the grain through said body.

6. A friction dry seed treater comprising in combination, a tubular body rotatable at a downward inclination toward its discharge end and adapted to contain the seed and a dry powder, said body being cylindrical at its intake end and having blades for agitating the grain and powder to coat the former with the latter, the remainder of said body being conical and internally smooth to frictionally fix the powder coating on the grain.

7. A friction dry seed treater comprising in combination, a conical body adapted to contain the seed and a powder and tapering toward its discharge end, means rotatably mounting said body to dispose its axis at a downward inclination toward its discharge end, and said body being tapered sufficiently to dispose its lowermost portion at an upward inclination to thereby resist discharge of the grain therefrom, and means for causing discharge of grain from said body.

8. A friction dry seed treater comprising in combination, a rotatable body having a conical discharge portion and a cylindrical intake portion inclined to deliver to said conical portion, and said cylindrical portion having agitating blades canted to promote delivery toward said discharge portion.

9. The herein-described method of dusting and subsequently "fixing" a coating of fungicide powder onto the surface of hard smooth seed grain such as wheat, which consists, in uniformly and simultaneously setting the powder and all the grain into sustained tumbling motion to initially mix and dust or partially coat the grain with the powder, and in subsequently uniformly setting the bodies of powder and grain into sustained intermingling rubbing and tumbling contact while simultaneously restraining discharging movement of the grain, and also simultaneously overcoming such restraining action by a preponderant influx of grain, whereby the restraining and preponderant influx of grain will combine with the tumbling contact of the grain to attritionally coat and "fix" the coating of powder on all the grain berries.

10. The herein-described method of "fixing" a fungicide powder coating partially applied or dusted onto seed grain, which consists, in uniformly setting the powder and all the grain berries into sustained intermingling rubbing and tumbling contact while simultaneously restraining discharging movement of the grain, whereby the combined restraining and rubbing action will attritionally "fix" and retain the coating of powder on all the grain berries.

11. A friction dry seed treater comprising in combination, a conical body adapted to contain the seed and powder and tapering toward its discharge end, means rotatably mounting said body to dispose its lowermost portion at an upward inclination to thereby resist discharge of grain therefrom and permanently fix the powder on said berries, and means for causing discharge of grain from said body.

12. A friction dry seed treater comprising in combination, a rotatable tubular body adapted to contain the seed and a fungicide powder, said body having a section resisting advance of the grain therethrough and attritionally fix the powder on the grain berries and a section promoting advance passage of the grain and the latter section being controlling to advance the grain through said body.

In testimony that I claim the foregoing as my own, I hereby affix my signature.

SYLVESTER J. WILLIAMS.